United States Patent … US 7,031,410 B1
Schenk et al. (45) Date of Patent: Apr. 18, 2006

(54) METHOD OF NOISE CANCELLATION IN A SIGNAL GENERATED BY DISCRETE MULTI-TONE MODULATION AND CIRCUIT FOR CARRYING OUT SAID METHOD

(75) Inventors: Heinrich Schenk, Munich (DE); Stefan Schneider, Graz (AT); Dietmar Straeussnigg, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/914,635
(22) PCT Filed: Mar. 1, 2000
(86) PCT No.: PCT/DE00/00613

§ 371 (c)(1),
(2), (4) Date: Feb. 25, 2002

(87) PCT Pub. No.: WO00/52892

PCT Pub. Date: Sep. 8, 2000

(30) Foreign Application Priority Data

Mar. 1, 1999 (DE) ................................ 199 08 806

(51) Int. Cl.
*H04L 25/08* (2006.01)
(52) U.S. Cl. ........................................ 375/346; 375/260
(58) Field of Classification Search ................ 375/346, 375/285, 267, 278, 284, 313, 260; 455/63.1, 455/296; 370/203, 208, 210
See application file for complete search history.

(56) References Cited

U.S. PATENT DOCUMENTS

| | | | | |
|---|---|---|---|---|
| 5,317,596 A | * | 5/1994 | Ho et al. | 375/232 |
| 5,521,908 A | * | 5/1996 | Younce et al. | 370/286 |
| 6,014,412 A | * | 1/2000 | Wiese et al. | 375/346 |
| 6,097,763 A | * | 8/2000 | Djokovic et al. | 375/260 |
| 6,396,886 B1 | * | 5/2002 | Kapoor | 375/350 |
| 6,535,554 B1 | * | 3/2003 | Webster et al. | 375/350 |
| 6,603,811 B1 | * | 8/2003 | Dobson et al. | 375/232 |
| 6,693,984 B1 | * | 2/2004 | Andre | 375/350 |
| 6,788,752 B1 | * | 9/2004 | Andre | 375/350 |

FOREIGN PATENT DOCUMENTS

DE 199.01.465 A1 5/2000
EP 0.768.778 A1 4/1997

OTHER PUBLICATIONS

Al-Dhahir, N. et al. "Optimum Finite-length Equalization for Multicarrier Transceivers" *IEEE Transactions On Communications* 44: 56–64, No. 1, 1996.

* cited by examiner

*Primary Examiner*—Betsy L. Deppe
(74) *Attorney, Agent, or Firm*—Fish & Richardson P.C.

(57) ABSTRACT

The invention relates to a method of canceling noise in a signal generated by discrete multi-tone modulation. The noise is caused primarily by the transient of a transmission channel via which the signal is transmitted. The signal comprises a plurality of symbols each of which is preceded by a cyclic prefix. According to the invention, a plurality of parameters is calculated from the digitized sample values of the signal and the approximate transient of the transmission channel is calculated from said plurality of parameters. To cancel the noise the approximately calculated transient is subtracted from the digitized sample values.

12 Claims, 2 Drawing Sheets

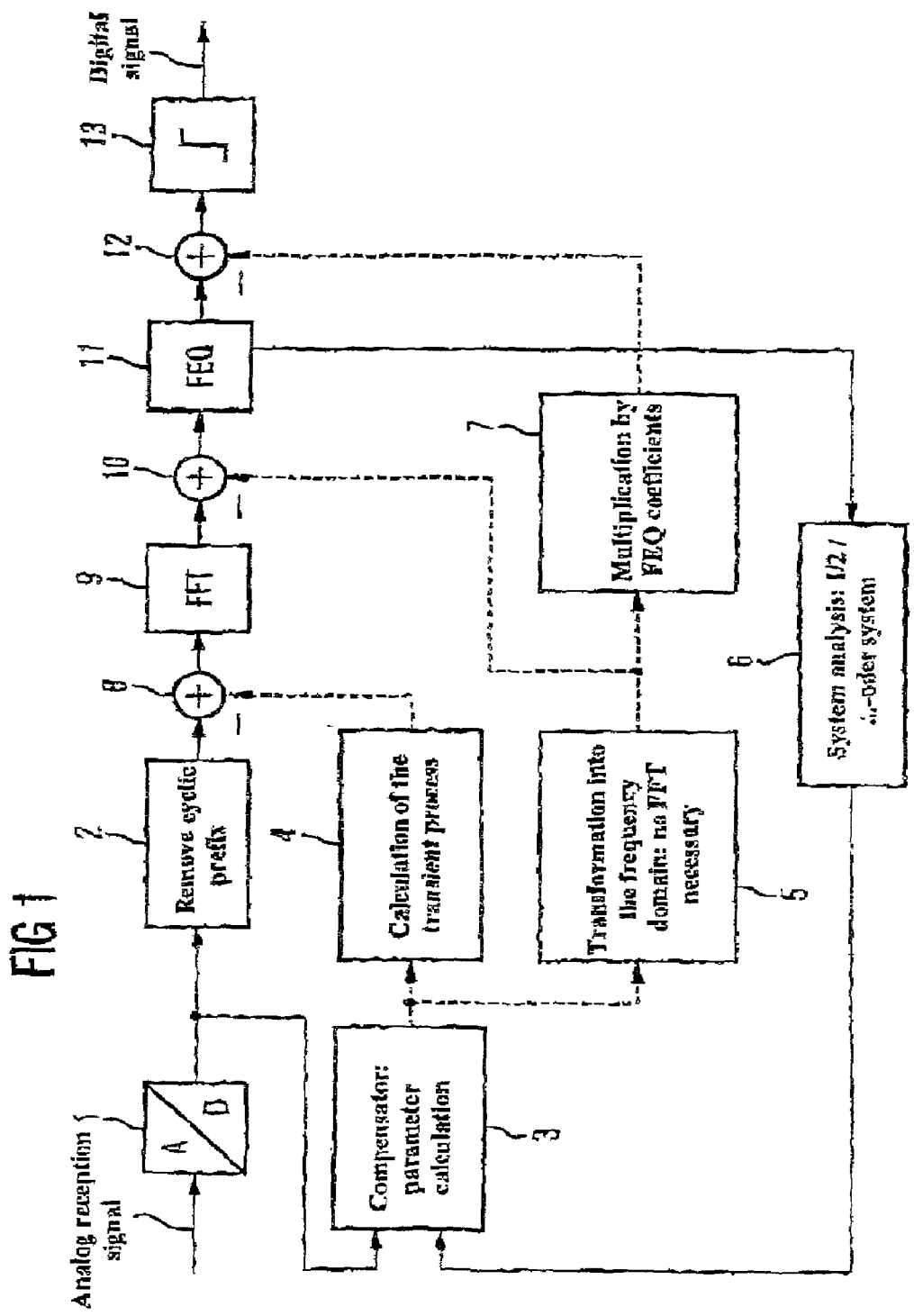

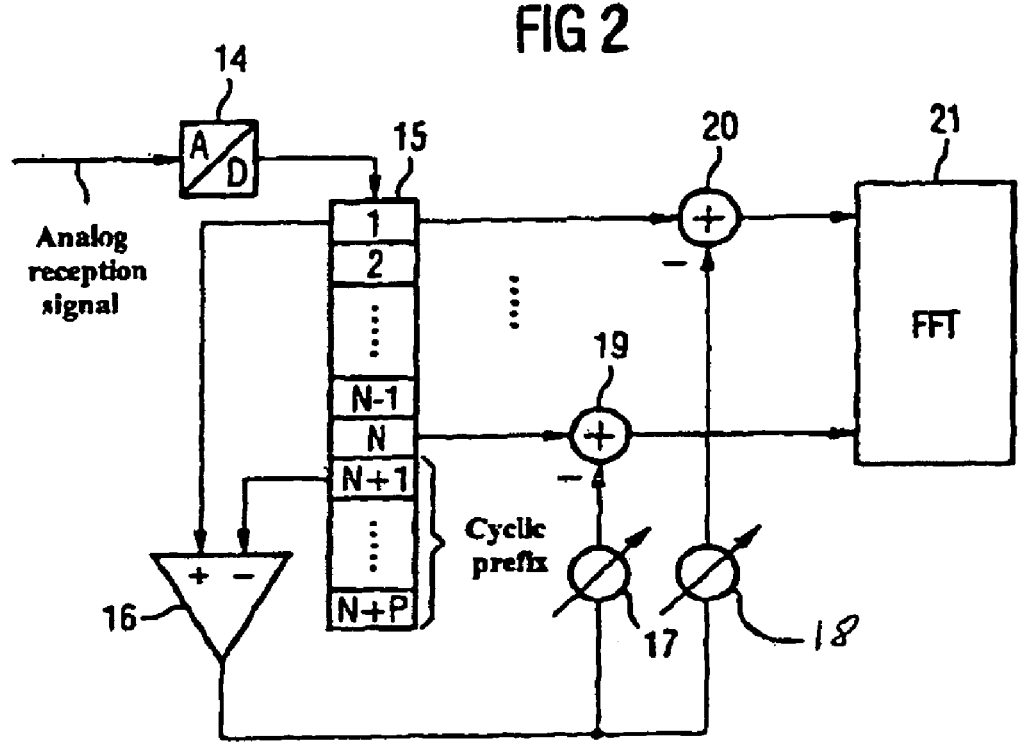
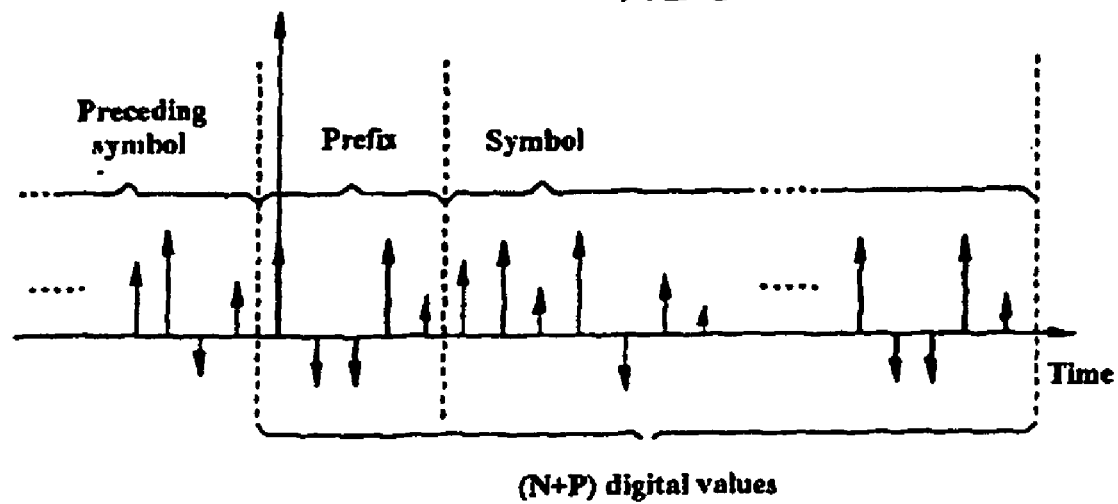

US 7,031,410 B1

METHOD OF NOISE CANCELLATION IN A SIGNAL GENERATED BY DISCRETE MULTI-TONE MODULATION AND CIRCUIT FOR CARRYING OUT SAID METHOD

FIELD OF INVENTION

The invention relates to a method for the compensation of interference in a signal generated by discrete multitone modulation.

BACKGROUND

Discrete multitone modulation (DMT)—also called multicarrier modulation—is a modulation method which is suitable in particular for the transmission of data via channels effecting linear distortion. Compared with a so-called single-carrier method—for example amplitude modulation—which has only one carrier frequency, a multiplicity of carrier frequencies are used in discrete multitone modulation. Each individual carrier frequency is modulated in amplitude and phase according to the quadrature amplitude modulation (QAM). A multiplicity of QAM-modulated signals are thus obtained. In this case, a specific number of bits can be transmitted per carrier frequency. Discrete multitone modulation is used for example for digital audio broadcasting DAB under the designation OFDM (Orthogonal Frequency Division Multiplex) and for the transmission of data via telephone lines under the designation ADSL (Asymmetric Digital Subscriber Line).

In ADSL, the physical transmission channel is a two-wire line (copper double core) of the telephone network. However, such a transmission channel has a long transient recovery time. Signals generated by discrete multitone modulation typically contain very short pulses having a high amplitude, which effect impulse responses that decay slowly in this transmission channel. If an impulse response has still not completely decayed when a new pulse arrives at the receiver, then interference occurs in the receiver. For compensation of such interference, DMT receivers 0contain time domain equalizers, for example, which are intended to shorten the impulse response of the transmission channel and avoid interference on account of superposition of an impulse response of a pulse that has not yet decayed and an impulse response of a subsequent pulse.

The time domain equalizer (TDEQ) may be embodied for example as a digital transversal filter whose coefficients are adjustable. The design of such time domain equalizers is described in Al-Dhahir, N., Cioffi, J. M., "Optimum Finite-Length Equalization for Multicarrier Transceivers", IEEE Trans.on Comm., Vol. 44, No. 1, January 1996.

The document U.S. Pat. No. 5,521,908 describes a method for determining a set of time domain parameters of an SIRF filter. To that end, the original channel and echo impulse responses are determined to an approximation and recorded on SIRF coefficients based on the combined channel and echo impulse responses that have been calculated to an approximation. An SSNR ratio is calculated for the SIRF coefficients, the individual steps being repeated for determining the coefficients with the best SSNR ratio.

The document EP 0 768 778 A1 comprises a method and a corresponding apparatus for the transmission of impulse responses. A set of parameters is calculated for an equalizer, which equalizes an impulse response in such a way that the equalized impulse response corresponds, to an approximation, to a desired impulse response of a predetermined length. To that end, an error function is minimized by means of eigenvalue and eigenvector calculation of a channel-dependent matrix. The channel-dependent matrix comprises a signal, a disturbed signal, a desired impulse response length and a desired impulse response delay. The error function has a first component, which represents the difference between an equalized impulse response and the desired impulse response, and a second component, which represents the energy transmitted in unused frequency bands. The eigenvector associated with the minimum eigenvalue of the channel-dependent matrix represents the set of equalizer parameters.

What is disadvantageous with such time domain equalizers, however, is the high number of coefficients of the digital transversal filter used as time domain equalizer, and the complex adaptation of the digital transversal filter. Given a filter length of 20 to 40 coefficients, approximately 50 to 100 million multiplications have to be carried out per second. Accordingly, a digital filter for time domain equalization requires a very high computing power. In addition, each coefficient has to be adjusted for the adaptation of the digital transversal filter. This requires a long adaptation time which has to be provided at the beginning of an ADSL transmission.

SUMMARY

The technical problem on which the invention is based resides, therefore, in specifying a method for the compensation of interference in a signal generated by discrete multitone modulation and a circuit arrangement for carrying out the method, wherein the method is simple to perform and the circuit arrangement is simple to produce and complex adaptation of coefficients is not necessary.

The invention relates to a method for the compensation of interference in a signal generated by discrete multitone modulation. The interference is essentially caused by the transient process of a transmission channel via which the signal is transmitted. The signal has a multiplicity of symbols and each symbol is preceded by a cyclic prefix. A multiplicity of parameters are calculated from the digitized samples of the signal. The transient process of the transmission channel is in turn calculated to an approximation from the multiplicity of parameters. For compensation of the interference, the transient process calculated to an approximation is subtracted from the digitized samples. Advantageously, the multiplicity of parameters are calculated directly from the signal and there is no need for time-consuming adaptation of coefficients as in the case of time domain equalizers. Consequently, convergence problems, caused by excessively long adaptation, cannot occur either. In this case, the transient process calculated to an approximation results from the consideration that the transmission channel behaves like a low-order linear system and the transient process of such a system can be calculated very simply. Advantageously, the transient process calculated to an approximation can be subtracted from the digitized samples in the time domain or in the frequency domain. In the event of subtraction in the frequency domain, Fourier transformation of the transient process calculated to an approximation is not necessary since the coefficients multiplied by exponential functions defining the transient process remain the same. In a preferred embodiment, each parameter is calculated by subtraction of a pair of digitized samples. In this case, it is particularly preferred for each pair of digitized samples to have a digitized sample of a symbol and a digitized sample of a cyclic prefix.

The invention furthermore relates to a circuit arrangement for carrying out a method for the compensation of interference in a signal generated by discrete multitone modulation. The signal has a multiplicity of symbols and each symbol is preceded by a cyclic prefix. In this case, digitized samples of the signal are fed to a serial/parallel converter. Furthermore, a multiplicity of subtractor circuits are provided. Each subtractor circuit subtracts a digitized sample of the symbol from a corresponding digitized sample of the cyclic prefix preceding the symbol. The result of the subtraction is an interference superposed on the digitized sample of the cyclic prefix. For each coefficient of the equation which was set up for calculating the transient process of the transmission channel to an approximation, multiplier circuits are provided which multiply the output signal of each subtractor circuit by the coefficients. The output signal of each multiplier circuit is then subtracted from the corresponding digital sample of the symbol.

Further advantages, features and possible applications of the invention emerge from the following description of exemplary embodiments in conjunction with the drawing, in which

BRIEF DESCRIPTION OF FIGURES

FIG. 1 shows a block diagram of the method for the compensation of interference in a signal generated by discrete multitone modulation; and FIG. 2 shows an exemplary embodiment of a circuit arrangement for carrying out the method for the compensation of interference in a signal generated by discrete multitone modulation; and FIG. 3 shows a block of the signal generated by discrete multitone modulation.

DETAILED DESCRIPTION

FIG. 1 illustrates a block diagram with the components essential to the invention and three different exemplary embodiments of the method, which are represented by broken lines. The block diagram illustrated corresponds to a receiver for a signal generated by discrete multitone modulation.

An analog reception signal which has been generated by discrete multitone modulation is fed to an analog-to-digital converter 1. The analog-to-digital converter 1 samples the analog reception signal and converts the samples of the analog reception signal into digital values.

A block of the signal generated by discrete multitone modulation is illustrated in FIG. 3. In this case, a number N+P of digital values form the block, which contains a transmitted symbol comprising N digital values. The remaining P digital values of the block correspond to the last P digital values of the symbol and form a cyclic prefix. The cyclic prefix is situated at the start of the block. The cyclic prefix generates a "pseudo-periodicity" which enables easier frequency domain equalization of the received signal for the receiver. This is because the transmission channel can be regarded as a linear transfer function.

As illustrated in FIG. 1, the digital values of the block are fed to a unit for removing the cyclic prefix 2, on the one hand, and to a compensation unit for parameter calculation 3, on the other hand.

The compensator unit for parameter calculation 3 calculates from the cyclic prefix interference brought about by the transient process of, in particular, the transmission channel. To that end, the corresponding digital values of the cyclic prefix and of the symbol are subtracted from one another. The result of the subtraction corresponds to the interference. This holds true, of course, only if the impulse response of the transmission channel is shorter than the time duration of a symbol including cyclic prefix. In this case, the digital values at the end of a block can be regarded as having settled and being free from errors. This means that interference on account of the transient process can be calculated very accurately. From this interference, the compensator unit 3 calculates parameters for a linear equation which specifies the transient process, which essentially causes the interference, to an approximation.

The linear equation for calculating the transient process to an approximation is based on the assumption that the transient process behaves like the transient process in a low-order linear system. In this case, first- and second-order systems have proved to be sufficient. In a second-order system taken as an example, the equation for calculating the transient process has two parameters $c_1$ and $c_2$. The general form of the equation for calculating the transient process is represented by the following formula:

$$e(n \cdot T) = c_1 \cdot f_1(n \cdot T) + c_2 \cdot f_2(n \cdot T) + \ldots$$

The functions $f_i(n \cdot T)$ are exponential functions which may also be complex conjugate. By means of Z transformation, the following equation for calculating the transient process holds true in the frequency domain:

$$E(z) = c_1 \cdot F_1(z) + c_2 \cdot F_2(z) + \ldots$$

Consequently, two digital values of the interference on account of the transient process are required for the calculation of two parameters $c_1$ and $c_2$.

The calculated parameters can be fed to a unit for calculating the transient process 4, on the one hand, and to a unit for transformation into the frequency domain 5, on the other hand.

If the compensation of the interference takes place in the time domain, then the transient process calculated by the unit for calculating the transient process 4 is subtracted from the output values of the unit for removing the cyclic prefix 2 by means of a first subtractor 8. The error-free digital values thus calculated are then fed to a unit for calculating the fast Fourier transform 9 (FFT), which converts the signal represented by the digital values from the time domain into the frequency domain.

If, instead of this, the compensation of the interference is intended to take place in the frequency domain, the output values of the unit for transformation into the frequency domain 5 are subtracted from the output values of the unit for calculating the fast Fourier transform 9 by means of a second subtractor 10. The error-free digital values thus calculated are then fed to a frequency domain equalizer 11 (FEQ=Frequency Equalization).

The frequency domain equalizer 11 is embodied as an adaptive digital filter whose coefficients are adapted to the transmission channel at the beginning of a transmission. If the frequency domain equalizer has been completely adapted, then the transfer function represents the inverse transfer function of the transmission channel.

The adapted values of the digital filter of the frequency domain equalizer are fed to a unit for system analysis 6. The unit for system analysis 6 calculates, from the coefficients fed to it, the properties of the transmission channel and composes therefrom the equation for calculating the transient process of the transmission channel to an approximation. This equation is fed to the compensator unit for parameter calculation 3 and evaluated by the latter.

As a third alternative, the compensation of interference can take place after the frequency domain equalization by the frequency domain equalizer 11. To that end, the output values of the unit for transformation into the frequency domain 5 are fed to a unit for multiplication by the FEQ coefficients 7. The unit for multiplication by FEQ coefficients 7 multiplies the values fed to it by the adapted coefficients of the frequency domain equalizer 11. The output values of the unit for multiplication by FEQ coefficients 7 are then subtracted from the output values of the unit for frequency domain equalization 11 by means of a third subtractor 12.

Finally, the interference-free digital values thus calculated are fed to a unit for decision and decoding 13, which generates a digital signal containing the information contained in the analog reception signal.

FIG. 2 illustrates an exemplary embodiment of a circuit arrangement for carrying out the method.

In this exemplary embodiment, the compensation of the interference takes place in the time domain before fast Fourier transformation.

An analog reception signal is fed to an analog-to-digital converter 14 which converts the analog reception signal fed to it into digital values.

The digital values at the output of the analog-to-digital converter 14 are fed to a unit for serial/parallel conversion 15.

The unit for serial/parallel conversion 15 has N+P storage locations for digital values. N+P digital values form exactly one block of the signal generated by discrete multitone modulation. In this case, a block has, at the start, the cyclic prefix comprising P digital values, and following that the symbol comprising N digital values.

In this exemplary embodiment, the transmission channel is regarded as a first-order system, only one digital value of the interference being required to calculate the transient process.

Assuming that the transient process of the channel has already decayed before the last digital value of a block (storage locations 1, 2) the error on account of the transient process is calculated by subtraction of the last digital value of the block (storage location 1) and the last digital value of the cyclic prefix (storage location N+1).

To that end, these digital values are fed to a subtractor 16. The calculated error at the output of the subtractor 16 is in each case fed to each each multiplier 17, 18. In this case, one multiplier is provided for each of the N digital values of the symbol. Each multiplier multiplies the error at the output of the subtractor 16 by a parameter which has been calculated by means of the system equation for a first-order linear system. The calculated transient process is in each case subtracted from a digital value of the symbol by means of subtractors 19, 20.

The digital values of the symbol that have thus been calculated and corrected are then fed to a unit for fast Fourier transformation 21, which converts the signal represented by the digital values fed to it from the time domain into the frequency domain for further processing

The invention claimed is:

1. A method for the compensation of interference in a signal generated by discrete multitone modulation, the interference essentially being caused by the transient process of a transmission channel via which the signal is transmitted, the signal having a multiplicity of symbols with digitized samples and each symbol being preceded by a cyclic prefix with digitized samples, the method having the following steps:
    feeding of the digitized samples of the signal to a serial/parallel converter (15);
    calculation of a difference between at least one digitized sample of a symbol and a digitized sample of the cyclic prefix preceding the symbol by means of at least one subtractor circuit (16), thereby determining interference;
    calculation of the transient process of the transmission channel from the determined interference by means of multiplier circuits (17, 18); and
    calculation of a difference between the calculated transient process and the digitized samples of the symbol.

2. The method as claimed in claim 1, characterized in that provision is made of corresponding devices (4, 8; 5, 10; 7, 12) for compensation of the interference in the time domain and in the frequency domain.

3. The method as claimed in claim 2, characterized in that coefficients that are calculated from an error-corrected digitized samples are fed to a system analysis unit (6) from which the properties of the transmission channel are calculated.

4. A circuit arrangement for carrying out the method as claimed in claim 3, the circuit arrangement comprising:
    a serial/parallel converter (15), to which the digitized samples of the signal are providable;
    at least one subtractor circuit (16), each subtractor circuit (16) calculating a difference between a digitized sample of the symbol and a digitized sample assigned thereto of the cyclic prefix preceding the symbol for a calculation of an error on account of the transient process; and
    at least one multiplier circuit (17, 18) for multiplication of the error by a specific parameter, the at least one multiplier circuit (17, 18) being assigned to each digitized sample of the symbol;
    wherein the output signal of each subtractor circuit (16) is providable in each case to each multiplier circuit (17, 18); and
    wherein the output signal of each multiplier circuit (17, 18) is subtractable from the corresponding digitized sample of the symbol by means of subtractor devices (19, 20).

5. A circuit arrangement for carrying out the method as claimed in claim 2, the circuit arrangement comprising:
    a serial/parallel converter (15), to which the digitized samples of the signal are providable;
    at least one subtractor circuit (16), each subtractor circuit (16) calculating a difference between a digitized sample of the symbol and a digitized sample assigned thereto of the cyclic prefix preceding the symbol for a calculation of an error on account of the transient process; and
    at least one multiplier circuit (17, 18) for multiplication of the error by a specific parameter, the at least one multiplier circuit (17, 18) being assigned to each digitized sample of the symbol;
    wherein the output signal of each subtractor circuit (16) is providable in each case to each multiplier circuit (17, 18); and
    wherein the output signal of each multiplier circuit (17, 18) is subtractable from the corresponding digitized sample of the symbol by means of subtractor devices (19, 20).

6. The method as claimed in claim 1, characterized in that coefficients which are calculated from error-corrected digitized samples are fed to a system analysis unit (6) from which the properties of the transmission channel are calculated.

7. A circuit arrangement for carrying out the method as claimed in claim 6, the circuit arrangement comprising:
- a serial/parallel converter (15), to which the digitized samples of the signal are providable;
- at least one subtractor circuit (16), each subtractor circuit (16) calculating a difference between a digitized sample of the symbol and a digitized sample assigned thereto of the cyclic prefix preceding the symbol for a calculation of an error on account of the transient process; and
- at least one multiplier circuit (17, 18) for multiplication of the error by a specific parameter, the at least one multiplier circuit (17, 18) being assigned to each digitized sample of the symbol;
- wherein for the output signal of each subtractor circuit (16) is providable in each case to each multiplier circuit (17, 18); and
- wherein the output signal of each multiplier circuit (17, 18) is subtractable from the corresponding digitized sample of the symbol by means of subtractor devices (19, 20).

8. A circuit arrangement for carrying out the method as claimed in claim 1, the circuit arrangement comprising:
- a serial/parallel converter (15), to which the digitized samples of the signal are providable;
- at least one subtractor circuit (16), each subtractor circuit (16) calculating a difference between a digitized sample of the symbol and a digitized sample assigned thereto of the cyclic prefix preceding the symbol for a calculation of an error on account of the transient process; and
- at least one multiplier circuit (17, 18) for multiplication of the error by a specific parameter, the at least one multiplier circuit (17, 18) being assigned to each digitized sample of the symbol;
- wherein the output signal of each subtractor circuit (16) is providable in each case to each multiplier circuit (17, 18); and
- wherein the output signal of each multiplier circuit (17, 18) is subtractable from the corresponding digitized sample of the symbol by means of subtractor devices (19, 20).

9. The method as claimed in claim 1, characterized in that provision is made of corresponding devices (4, 8; 5, 10; 7, 12) for compensation of the interference in the frequency domain.

10. The method as claimed in claim 9, characterized in that coefficients which are calculated from the error-corrected digitized samples are fed to a system analysis unit (6) from which the properties of the transmission channel are calculated.

11. A circuit arrangement for carrying out the method as claimed in claim 10, the circuit arrangement comprising:
- a serial/parallel converter (15), to which the digitized samples of the signal are providable;
- at least one subtractor circuit (16), each subtractor circuit (16) calculating a difference between digitized sample of the symbol and a digitized sample assigned thereto of the cyclic prefix preceding the symbol for a calculation of the error on account of the transient process; and
- at least one multiplier circuit (17, 18) for multiplication of the error by a specific parameter, the at least one multiplier circuit (17, 18) being assigned to each digitized sample of the symbol;
- wherein the output signal of each subtractor circuit (16) is providable in each case to each multiplier circuit (17, 18); and
- wherein the output signal of each multiplier circuit (17, 18) is subtractable from the corresponding digitized sample of the symbol by means of subtractor devices (19, 20).

12. A circuit arrangement for carrying out the method as claimed in claim 9, the circuit arrangement comprising:
- a serial/parallel converter (15), to which the digitized samples of the signal are providable;
- at least one subtractor circuit (16), each subtractor circuit (16) calculating a difference between a digitized sample of the symbol and a digitized sample assigned thereto of the cyclic prefix preceding the symbol for a calculation of an error on account of the transient process; and
- at least one multiplier circuit (17, 18) for multiplication of the error by a specific parameter, the at least one multiplier circuit (17, 18) being assigned to each digitized sample of the symbol;
- wherein the output signal of each subtractor circuit (16) is providable in each case to each multiplier circuit (17, 18); and
- wherein the output signal of each multiplier circuit (17, 18) is from the corresponding digitized sample of the symbol by means of subtractor devices (19, 20).

* * * * *